Oct. 8, 1929.   I. C. STERNBERG   1,730,866
HUMIDIFYING APPARATUS
Filed May 27, 1927
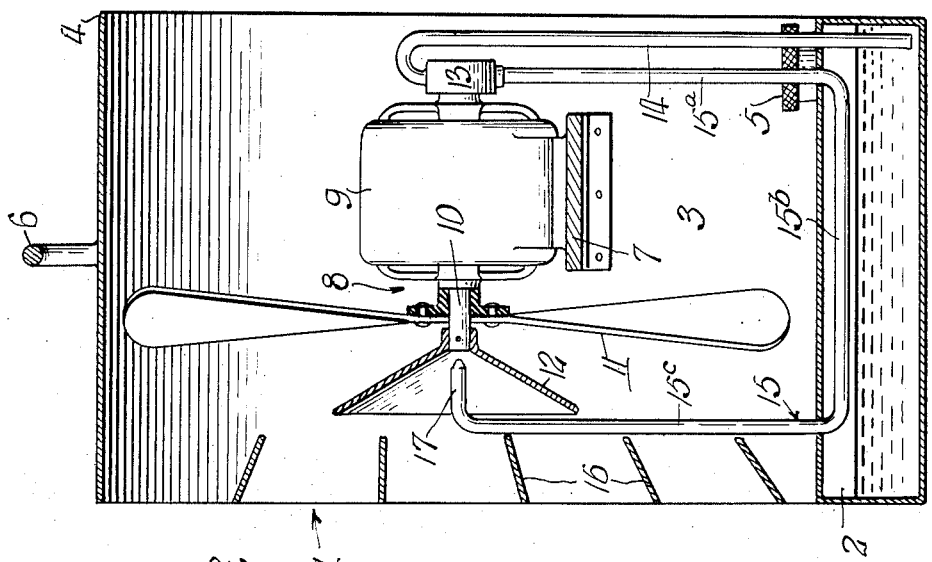
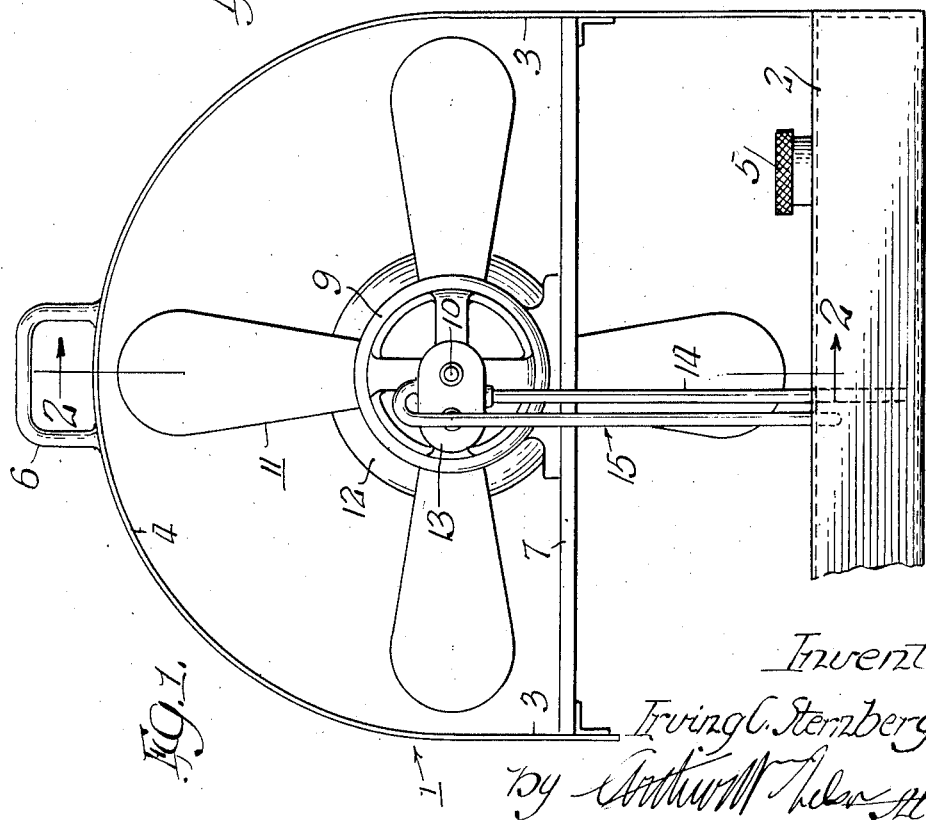
Inventor
Irving C. Sternberg Patented Oct. 8, 1929

1,730,866

UNITED STATES PATENT OFFICE

IRVING C. STERNBERG, OF NEW YORK, N. Y., ASSIGNOR TO ARCTIC NU-AIR CORPORATION, OF CHICAGO, ILLINOIS, A CORPORATION OF ILLINOIS

HUMIDIFYING APPARATUS

Application filed May 27, 1927. Serial No. 194,621.

This invention relates to improvements in humidifying apparatus and it consists of the matters hereinafter described and more particularly pointed out in the appended claims.

The primary object of the invention is to provide an apparatus of this kind which is portable and which is simple in construction and efficient in operation for its intended purpose.

Another object of the invention is to provide an apparatus of this kind which includes a fan and a pump by which water is forced to an atomizing nozzle arranged to discharge coaxially of the fan and against a vaporizing disc carried by said fan, the centrifugal action of the disc breaking up the water into a fine mist and discharging the same into the current of air produced by the fan.

These objects of the invention as well as others, together with the many advantages thereof will more fully appear as I proceed with my specification.

In the drawing:

Fig. 1 is a view in rear elevation of a humidifier embodying the preferred form of my invention.

Fig. 2 is a longitudinal vertical sectional view through the same as taken on the line 2—2 of Fig. 1.

In general my improved apparatus includes an open ended casing, the bottom of which is formed to provide a water supply compartment and the top of which is formed by a semi-circular wall. Extending transversely of the casing is a shelf upon which is supported a motor driven fan with the armature shaft arranged coaxially with the semi-circular top wall. On the rear end of this shaft and driven thereby is a pump which delivers water from the tank to an atomizing nozzle arranged to discharge coaxially with respect to the fan which includes a tapering vaporizing disc, that acts centrifugally to break up the atomized water in a fine vapor or mist that is picked up and discharged by the moving air produced by the fan.

Referring now in detail to that embodiment of the invention illustrated in the accompanying drawing: 1 indicates as a whole the casing of my improved apparatus which is open at its front and rear ends. Said casing includes a hollow tank like base or bottom 2, upright side walls 3—3 and a semi-circular top wall 4 which connects said side walls. The hollow base or bottom 2 constitutes a water supply tank, there being a filler spout 5 on the top wall thereof near one side wall at the rear. On the semicircular top wall at about the middle is provided a handle 6 by which the entire apparatus may be readily moved about.

The side walls 3—3 are connected together near the rear of the casing by a transversely arranged shelf 7 disposed a suitable distance below the axis of the semi-circular top wall 4. On this shelf which braces the side walls of the casing, is supported a motor driven fan indicated as a whole at 8. The motor 9 thereof is suitably fixed to said support and the armature shaft 10 of said motor is disposed coaxially with respect to said top wall 4. On the front end of the armature shaft is fixed a fan 11 and forwardly of said fan is fixed a tapered or outwardly and forwardly flared conical disc 12.

13 indicates a pump of any suitable kind which is driven by the rear end of said armature shaft. The inlet side of said pump is connected by a tube 14 with the interior of the tank 2, said tube terminating near the bottom of said tank. 15 indicates a U shaped tube having its rear vertical leg $15^a$ passing downwardly into the tank, when its horizontal leg $15^b$ passes toward the front of the tank and is joined to the bottom end of the front vertical leg $15^c$. This front leg is disposed between the disc 12 and a plurality of deflecting louvers 16 extending transversely at the front of the casing and the top end of said leg is bent rearwardly to provide an atomizing nozzle 17 arranged coaxially with the armature shaft 10.

The operation of the apparatus is as follows:

Assume that the motor 9 is running. Water is drawn from the tank 2 up through the tube 14 by the pump 13 and is delivered under pressure to the nozzle 17 from which it is discharged in the form of fine droplets. These atomized particles or droplets of water impinge against the extreme front end of the armature shaft and are picked up by the disc 12 and whirled centrifugally to further break them up into a fine mist or vapor. The disc being tapered as before described, will direct the mist not only radially outward but also forward and as it leaves the disc, it will mingle with and be incorporated into the moving column of air produced by the fan. As this moisture ladened air passes out between the louvers, it is deflected thereby in the proper direction.

The apparatus is simple in construction and is light in weight so that it may be readily moved about from place to place. It is efficient in operation and consists of but a few parts which cannot readily get out of order.

While in describing my invention, I have referred in detail to the form and arrangement of the various parts thereof, the same is to be considered as by way of illustration only so that I do not wish to be limited thereto except as may be pointed out in the appended claims.

I claim as my invention:

1. An apparatus of the kind described embodying therein, a motor having an armature shaft, a fan fixed to said shaft and a disc on said shaft forwardly of the fan, and means also actuated by said shaft for delivering atomized water under pressure coaxially of and against said disc.

2. An apparatus of the kind described embodying therein an open front and rear ended casing having a water tank at the bottom, a motor having an armature shaft, means supporting said motor within the casing above said tank, a fan and a disc fixed to one end of said shaft, a pump driven by the other end of said shaft, and means connecting said pump and tank and including a discharge nozzle for directing water coaxially of and against said disc.

3. An apparatus of the kind described embodying therein an open front and rear ended casing having a water tank at the bottom, a motor having an armature shaft, means supporting said motor within the casing above said tank, a fan and a forwardly tapering disc fixed on the front end of said shaft, a pump driven by the rear end of said shaft and tubing connecting said tank, pump and discharging water under pressure coaxially with and against said disc.

4. An apparatus of the kind described embodying therein an open front and rear ended casing having a water tank at the bottom and semicircular top wall, a motor supported in said casing and having its armature shaft disposed coaxially with said top wall, a fan and a tapered disc fixed on the front end of said shaft, a pump driven by the rear end of said shaft, a pipe connecting said tank with the inlet of said pump and a second pipe connected to the outlet of said pump and terminating in an atomizing nozzle discharging coaxially with and against said disc.

5. An apparatus of the kind described embodying therein an open front and rear ended casing having a water tank at the bottom and having upright side walls and a semicircular top wall connecting said side walls, a shelf connecting said side walls above the tank, a motor on said shaft and including an armature shaft, a fan and a forwardly and outwardly tapering disc on the front end of the shaft, a pump driven by the rear end of said shaft, a tube connecting the inlet of said pump with said tank, and a second tube connected to the outlet of said pump and terminating in an atomizing nozzle discharging coaxially against said disc.

In testimony whereof, I have hereunto set my hand, this 16 day of May, 1927.

IRVING C. STERNBERG.

CERTIFICATE OF CORRECTION.

Patent No. 1,730,866.                              Granted October 8, 1929, to

IRVING C. STERNBERG.

It is hereby certified that error appears in the printed specification of the above numbered patent requiring correction as follows: Page 2, line 76, claim 5, for the word "shaft" read "shelf"; and that the said Letters Patent should be read with this correction therein that the same may conform to the record of the case in the Patent Office.

Signed and sealed this 29th day of October, A. D. 1929.

(Seal)

M. J. Moore,
Acting Commissioner of Patents.